United States Patent
Malaika

(10) Patent No.: US 10,694,170 B2
(45) Date of Patent: Jun. 23, 2020

(54) CONTROLLING IMAGE DISPLAY VIA REAL-TIME COMPRESSION IN PERIPHERAL IMAGE REGIONS

(71) Applicant: Valve Corporation, Bellevue, WA (US)

(72) Inventor: Yasser Malaika, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 57 days.

(21) Appl. No.: 15/912,323

(22) Filed: Mar. 5, 2018

(65) Prior Publication Data

US 2019/0273910 A1 Sep. 5, 2019

(51) Int. Cl.
  *H04N 13/332* (2018.01)
  *A63F 13/25* (2014.01)
  *G02B 27/01* (2006.01)
  *G06F 3/01* (2006.01)

(52) U.S. Cl.
  CPC ........... *H04N 13/332* (2018.05); *A63F 13/25* (2014.09); *G02B 27/017* (2013.01); *G06F 3/013* (2013.01)

(58) Field of Classification Search
  None
  See application file for complete search history.

(56) References Cited

U.S. PATENT DOCUMENTS

| | | | | |
|---|---|---|---|---|
| 10,572,764 B1 * | 2/2020 | Bastani | ................... | G02B 30/34 |
| 2007/0160305 A1 | 7/2007 | Demos | | |
| 2015/0003537 A1 * | 1/2015 | Ward | ....................... | G06T 5/009 |
| | | | | 375/240.25 |
| 2016/0314562 A1 * | 10/2016 | Sakamoto | ............... | G06F 1/163 |
| 2017/0045941 A1 * | 2/2017 | Tokubo | .................... | G06F 3/167 |
| 2017/0102581 A1 * | 4/2017 | Peng | .................. | G02F 1/134309 |
| 2017/0287112 A1 * | 10/2017 | Stafford | ................. | G06F 3/0304 |
| 2019/0026874 A1 * | 1/2019 | Jin | ........................... | G06F 3/013 |
| 2019/0378305 A1 * | 12/2019 | Fitzgerald | ............ | H04N 19/167 |

OTHER PUBLICATIONS

International Search Report and Written Opinion dated May 23, 2019, for International Application No. PCT/US19/20320, 18 pages.

\* cited by examiner

*Primary Examiner* — Kenneth B Lee, Jr.
(74) *Attorney, Agent, or Firm* — Seed Intellectual Property Law Group LLP

(57) ABSTRACT

Techniques are described for controlling image display via compression of image data in some image regions while performing less or no compression in other (e.g., peripheral view) regions, with color-specific compression preserving chromatic aberration compensation. Such techniques may be used with display panel(s) of a head-mounted display device used for virtual reality display. A primary region of an image at which to encode and display data at a highest resolution level may be determined by tracking a gaze of a user, while other secondary regions may be selected to be surrounding or other outside the primary region. In the secondary regions, image data for a first (e.g., green) color channel may be encoded at a first compression level for a first resolution level lower higher than for other second color channels, and HDR data may be compressed at higher compression levels than the color-specific data.

29 Claims, 7 Drawing Sheets

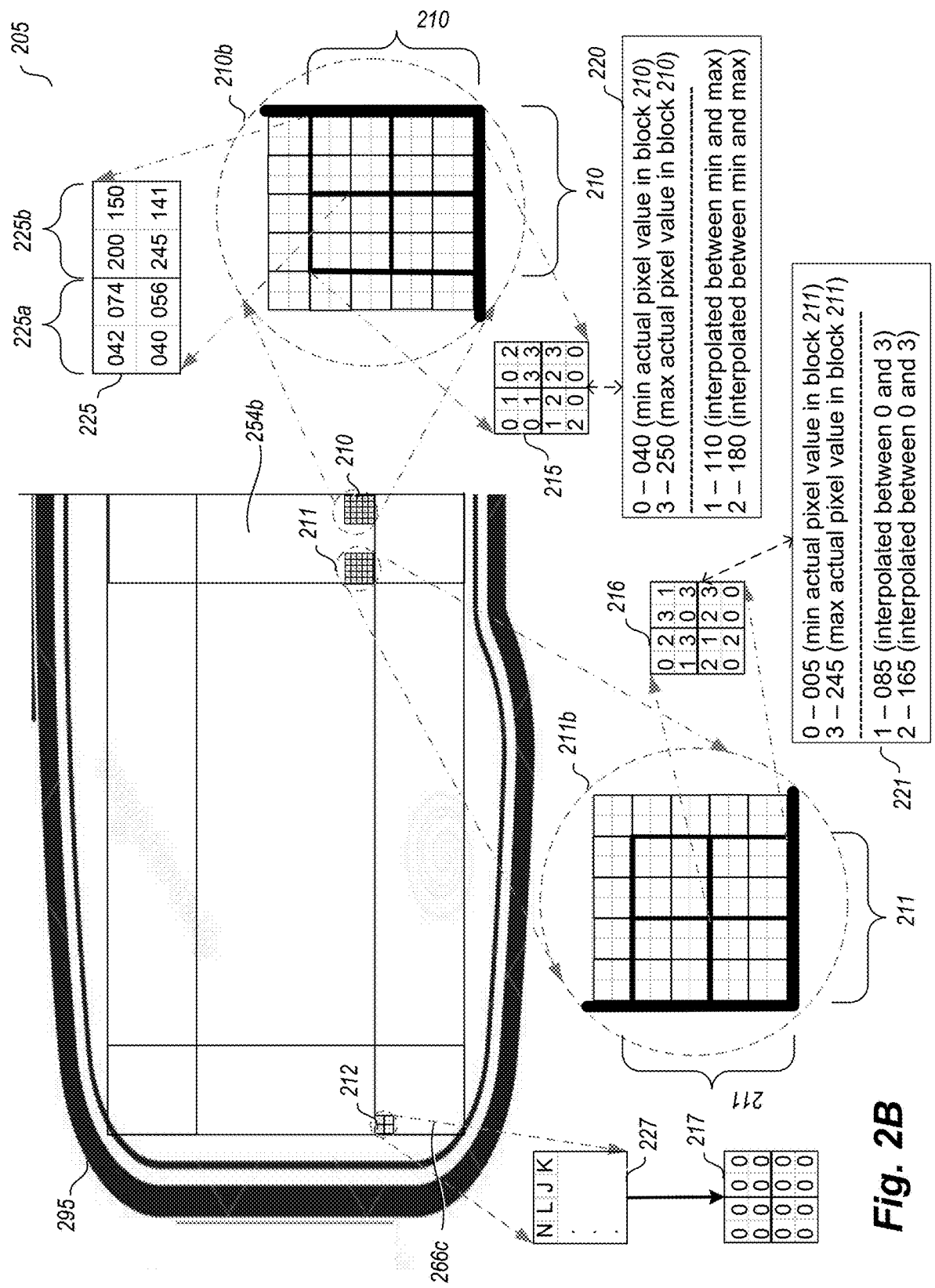

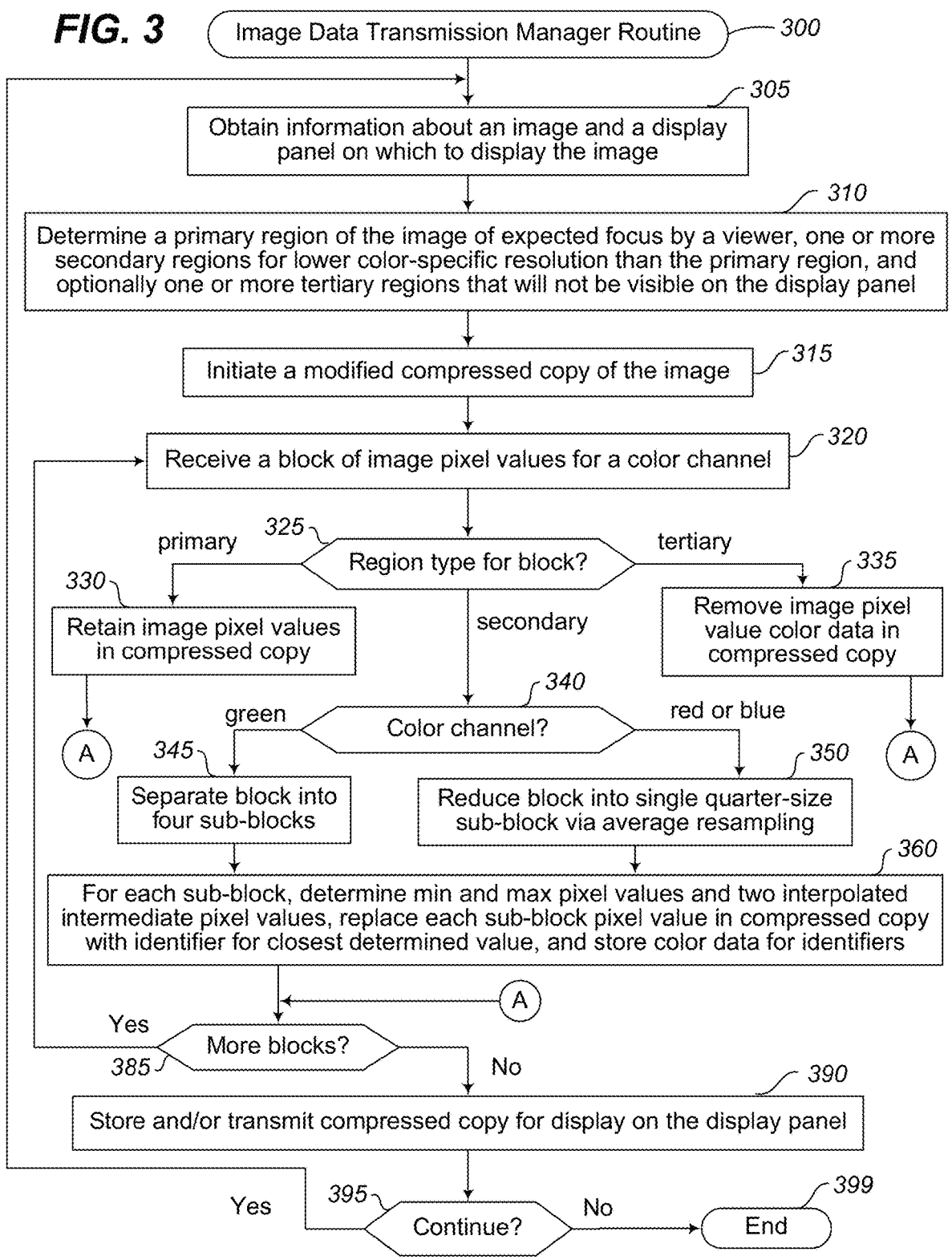

CONTROLLING IMAGE DISPLAY VIA REAL-TIME COMPRESSION IN PERIPHERAL IMAGE REGIONS

TECHNICAL FIELD

The following disclosure relates generally to techniques for controlling display of image data on a display panel, and more specifically to techniques for reducing the bandwidth for transmission of image data to the display panel via use of compression in peripheral regions of an image.

BACKGROUND

Demand for increasing visual display capability has resulted in large corresponding increases in image data size and demand for associated transmission bandwidth usage. For example, increasing visual display resolution in gaming devices, video display devices, mobile computing, general purpose computing, etc. has resulted in higher transmission bandwidths, as has High Dynamic Range ("HDR") data that uses greater bandwidth per pixel to present enhanced realism in imagery. In addition, the growing popularity of virtual reality ("VR") and augmented reality ("AR") systems, particularly those using head mounted display ("HMD") devices, has further increased such demand. Virtual reality systems typically envelop a wearer's eyes completely and substitute a "virtual" reality for the actual view (or actual reality) in front of the wearer, while augmented reality systems typically provide a semi-transparent or transparent overlay of one or more screens in front of a wearer's eyes such that an actual view is augmented with additional information.

However, such head mounted displays, with reduced distance between a viewer's eye and the display and often with a fully obscured field of view, have increased the performance requirements of display systems in ways that traditional display and transmission capabilities cannot satisfy and often have varying optimal resolution densities across the display.

BRIEF DESCRIPTION OF THE DRAWINGS

FIGS. 2A-2C illustrate examples of encoding and decoding image data for display in accordance with at least some of the techniques described herein.

FIG. 3 is a flow diagram of an example embodiment of an Image Data Transmission Manager routine.

DETAILED DESCRIPTION

Figure 1A:
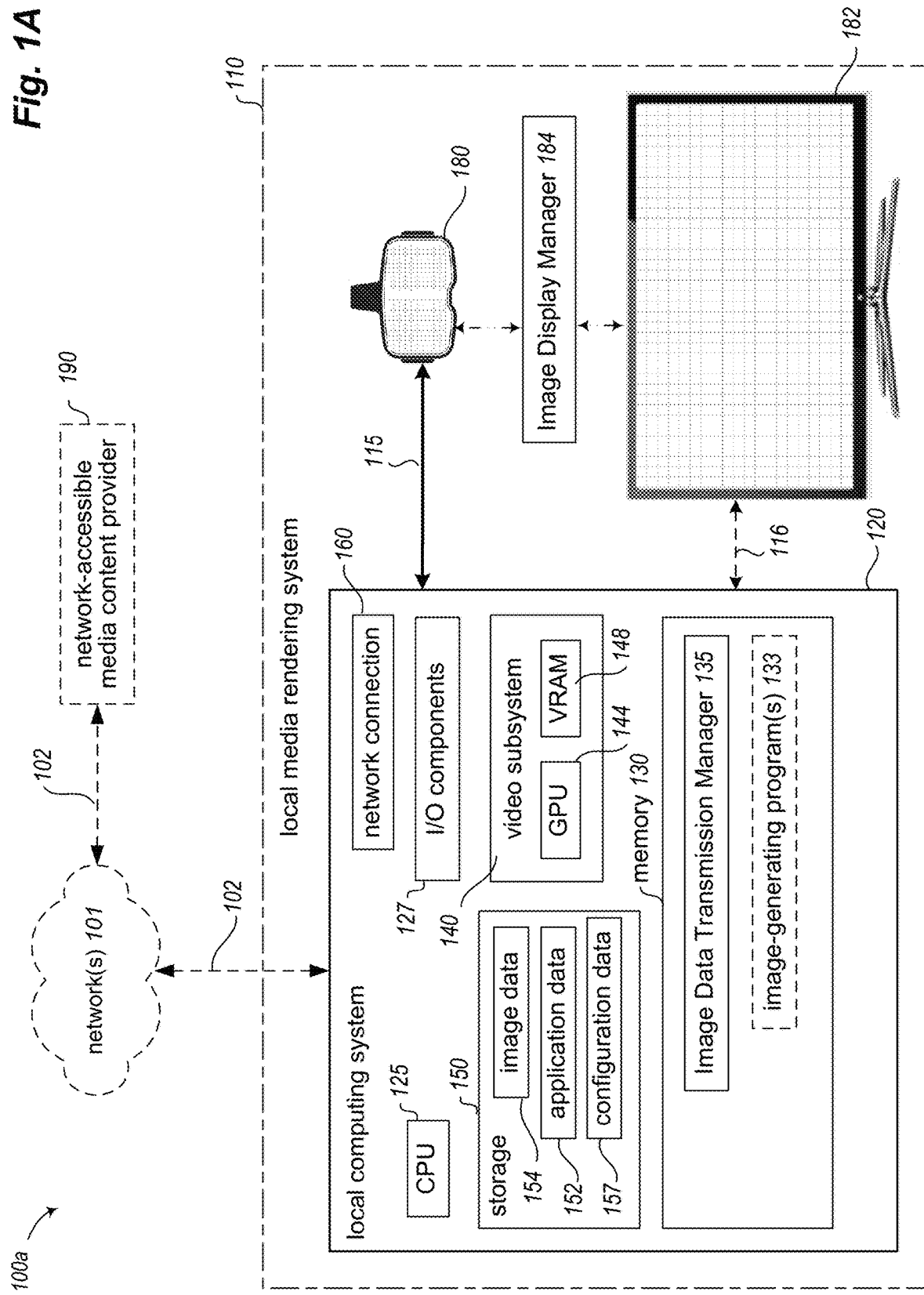
FIG. 1A is a schematic diagram of a networked environment that includes one or more systems suitable for performing at least some techniques described in the present disclosure, including embodiments of an Image Data Transmission Manager ("IDTM") system and of an Image Display Manager ("IDM") system.

The present disclosure relates generally to techniques for controlling display of image data on a display panel, such as to reduce bandwidth of image data transmission to the display panel by using color-specific compression of image data in peripheral regions of the image. Such techniques may be used, for example, with frames of video data and/or other images, and in some embodiments are used with one or more display panels that are part of a head-mounted display ("HMD") device used for VR and/or AR display techniques. The peripheral regions of the image in which the color-specific compression is performed may include, for example, edges of the image, or at one or more other image portions on which the user is not focused or is not expected to focus attention. Some or all of the techniques described herein may be performed via automated operations of embodiments of an Image Data Transmission Manager ("IDTM") system that encodes image data on a video rendering system before transmitting the encoded data to one or more display panels, and/or of an Image Display Manager ("IDM") system that decodes such image data on or near a device housing the display panel(s) and displays the decoded image data on the display panel(s), as discussed in greater detail below.

In at least some such embodiments, the techniques include determining at least one primary region of an image at which to encode and display data at a primary resolution level (e.g., without any compression or any lossy compression, so as to provide full resolution, or otherwise at a higher resolution than one or more other secondary regions)—for example, the primary region(s) may be determined in various manners in various embodiments, including based on tracking an actual or expected gaze of a user and using a corresponding area of the image as the primary region, determining an area of the image corresponding to one or more primary content portions of the image that are likely to be of most interest to a viewer (e.g., as identified by a software program generating the image) and using a corresponding area of the image as the primary region, in a predefined manner for some or all images (e.g., using a center and surrounding portions of the image as the primary region), based at least in part on one or more preferences of the end user who will view the image or other information specified by the end user, etc. It will be appreciated that different images may have different locations or areas that are their primary regions, such as when the primary region is dynamically determined based on current conditions at or near the time of determination (e.g., as a user's gaze moves from one corner to another corner, for the locations of the determined primary regions to follow the changing focus of the gaze). Additional details are included below related to determining primary regions and to encoding and displaying data for such primary regions.

Additional secondary region(s) of such an image may surround or otherwise be outside the one or more primary regions (e.g., such as at the sides and/or corners of the image if the primary region is centered near or at the center of the image), and thus be outside of or at a periphery of the user's actual or expected focus (e.g., to be perceived in whole or in part by the user via the user's peripheral vision). Furthermore, in at least some embodiments, the lower resolution of data displayed in the secondary region(s) is obtained at least in part by performing color-specific compression of image data in the peripheral secondary region(s), such as to encode and display image data for a green color channel at a first compression level that provides a first resolution level lower than the primary region's primary resolution level, and to encode and display image data for red and/or blue color channels at one or more second compression levels that provide one or more second resolution levels lower than the green color channel's first resolution level. While in some embodiments the secondary region(s) may be determined based in whole or in part relative to the one or more primary regions (e.g., as surrounding or otherwise being outside the one or more primary regions), in other embodiments the secondary regions may be determined in whole or in part in other manners, such as based on one or more affirmative attributes or characteristics of the secondary regions (e.g., based on a type of content, on particular locations within the image, etc.). It will also be appreciated that different images may have different locations or areas that are their secondary regions, such as when a secondary region is dynamically determined based on current conditions at or near the time of determination. Additional details are included below related to determining secondary regions and to encoding and displaying data for such secondary regions.

In at least some embodiments, one or more tertiary regions of an image may similarly be determined for which image data will not be displayed, and thus may not be encoded in at least some such embodiments, or may be encoded in other embodiments at a lowest possible resolution level. As one example, the image may be constructed in a rectangular shape, but may be displayed using a circular or oval subset of that rectangle, such as for a display panel of an HMD device that is viewed via a circular or semi-spherical lens in the HMD device—if so, portions of the image outside that circular or oval subset (e.g., corners and/or edges) may be selected as tertiary regions. In other embodiments, tertiary regions may be selected in other manners, such as if gaze tracking or other functionality allows a determination that certain portions of an image will not be viewed (e.g., for an image with 360-degree image but in which a viewer is only looking in a single direction). It will be further appreciated that different images may have different locations or areas that are their tertiary regions, such as when a tertiary region is dynamically determined based on current conditions at or near the time of determination, while other images and/or embodiments may not include any such tertiary regions. Additional details are included below related to determining tertiary regions and to encoding and displaying data for such tertiary regions.

As noted above, some or all of the techniques described herein may be performed via automated operations of embodiments of an IDTM system and/or an IDM system, such as implemented by one or more configured hardware processors and/or other configured hardware circuitry (e.g., on a video rendering system and/or on an HMD device or other device that includes one or more display panels). The one or more hardware processors or other configured hardware circuitry of such a system or device may include, for example, one or more GPUs ("graphical processing units") and/or CPUs ("central processing units") and/or other microcontrollers ("MCUs") and/or other integrated circuits, such as with the hardware processor(s) being part of an HMD device or other device that incorporates one or more display panels on which the image data will be displayed and/or being part of a computing system that generates or otherwise prepares the image data to be sent to the display panel(s) for display, as discussed further below. More generally, such a hardware processor or other configured hardware circuitry may include, but is not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), digital signal processors (DSPs), programmable logic controllers (PLCs), etc. Additional details are included elsewhere herein, including with respect to FIG. 1A below.

In at least some embodiments, the size of encoded data to be transmitted (or degree of size reduction from the encoding) may be dynamically modified in various ways, including based on modifying degrees or levels of compression used and/or modifying size or shape of primary and/or secondary regions of the image. Non-limiting examples of factors used to determine the encoded data size or size reduction may include graphical computing capacity limitations or objectives, such as to reflect processor demand levels; data transmission bandwidth and/or signal strength limitations or objectives; media content (e.g., based on scene complexity or other content characteristic, such as specified by a software program generating the image and/or by the IDTM system analyzing the image; based on a portion of the image corresponding to a predicted or otherwise expected focal point of the viewer user; etc.); media type (e.g., whether the content to be encoded has previously been encoded in another manner that may affect transmission bandwidth, such as via lossless or lossy compression); an indicated type of destination display device; graphical limitations and objectives (e.g., a target image resolution or target frame rate); visual tracking information (such as based on one or more indications of user eye or gaze position and focus); one or more predefined user preferences; etc.

Benefits in at least some embodiments of the described techniques include addressing and mitigating increased media transmission bandwidths for image encoding by reducing image data size, improving speed of controlling display panel pixels (e.g., based at least in part on corresponding reduced image data size), improving foveated image systems and other techniques that reflect subsets of display panels and/or images of particular interest, etc. Foveated image encoding systems take advantage of particular aspects of the human visual system (which may provide detailed information only at and around a point of focus), but often use specialized computational processing in order to avoid visual artifacts to which peripheral vision is very sensitive (e.g., artifacts related to motion and contrast in video and image data). In cases of certain VR and AR displays, both the bandwidth and computing usage for processing high resolution media are exacerbated because a particular display device involves two separate display panels (i.e., one for each eye) with two separately addressable pixel arrays, each involving an appropriate resolution. Thus, the described techniques may be used, for example, for decreasing the transmission bandwidth for local and/or remote display of a video frame or other image, while preserving resolution and detail in a viewer's "area of interest" within an image while minimizing computing usage for processing such image data. Furthermore, the use of lenses in head-mounted display devices and with other displays may provide a greater focus or resolution on a subset of the display panel, such that using such techniques to display lower-resolution information in other portions of the display panel may further provide benefits when using such techniques in such embodiments.

For illustrative purposes, some embodiments are described below in which specific types of information are acquired and used in specific types of ways for specific types of structures and by using specific types of devices. However, it will be understood that such described techniques may be used in other manners in other embodiments, and that the invention is thus not limited to the exemplary details provided. As one non-exclusive example, various of the embodiments discussed herein include the use of images that are video frames—however, while many examples described herein refer to a "video frame" for convenience, it will be appreciated that the techniques described with reference to such examples may be employed with respect to one or more images of various types, including non-exclusive examples of multiple video frames in succession (e.g., at 30 or 60 or 90 or 180 or some other quantity of frames per second), other video content, photographs, computer-generated graphical content, other articles of visual media, or some combination thereof. As another non-exclusive example, while some illustrated embodiments discuss an implementation of an embodiment of the described techniques that uses differing compression levels and techniques for different particular color channels in particular manners, other embodiments may implement the compression in other manners. In addition, various details are provided in the drawings and text for exemplary purposes, but are not intended to limit the scope of the invention. In addition, as used herein, a "pixel" refers to the smallest addressable image element of a display that may be activated to provide all possible color values for that display. In many cases, a pixel includes individual respective sub-elements (in some cases as separate "sub-pixels") for separately producing red, green, and blue light for perception by a human viewer, with separate color channels used to encode pixel values for the sub-pixels of different colors. A pixel "value" as used herein refers to a data value corresponding to respective levels of stimulation for one or more of those respective RGB elements of a single pixel.

Figure 1B:
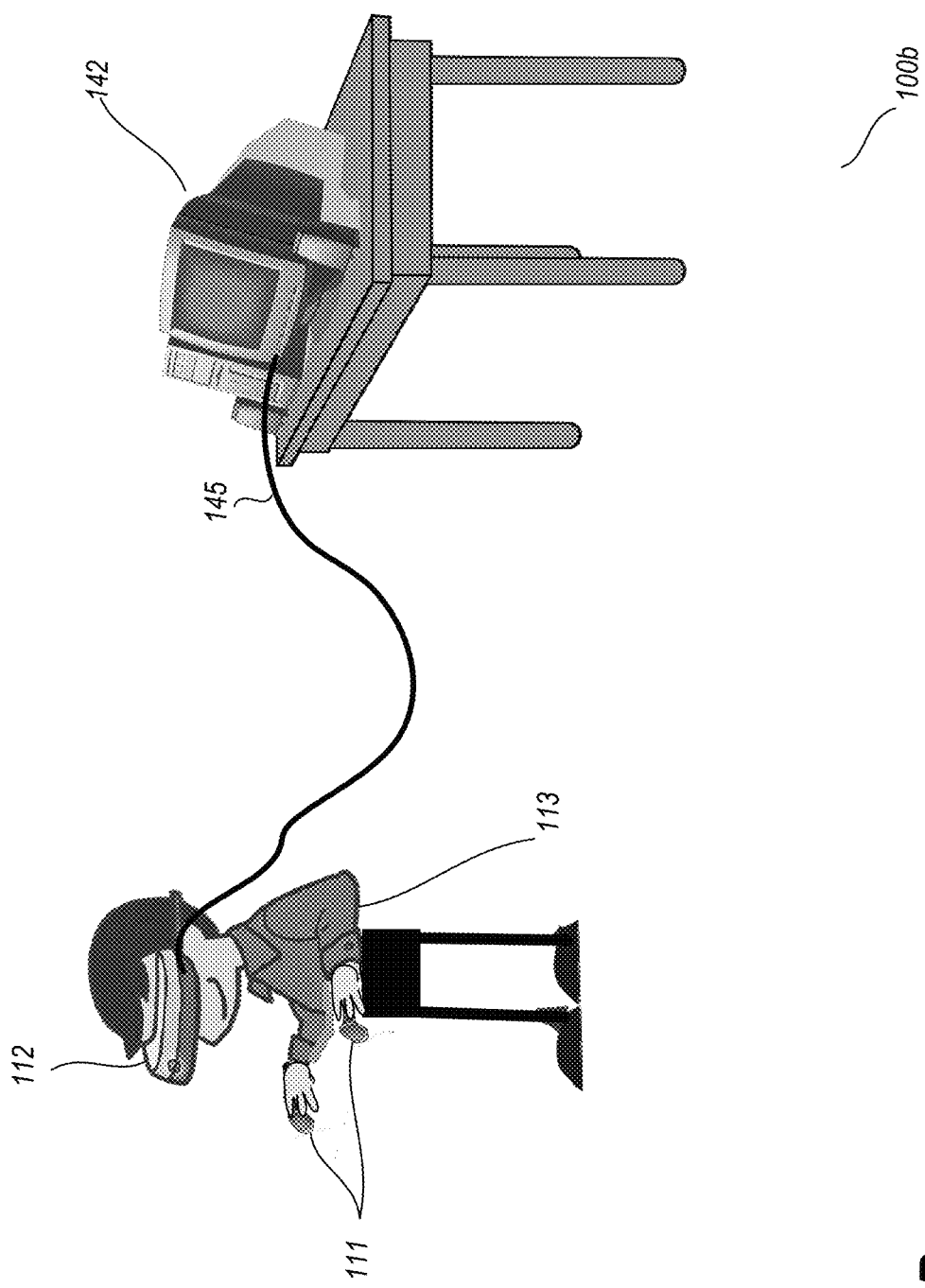
FIG. 1B is a diagram illustrating an example environment in which at least some of the described techniques are used with an example head-mounted display device that is tethered to a video rendering computing system and providing a virtual reality display to a user.

FIG. 1A is a schematic diagram of a networked environment 100a that includes a local media rendering (LMR) system 110 (e.g., a gaming system), which includes a local computing system 120 and display device 180 (e.g., an HMD with two display panels) suitable for performing at least some techniques described herein. In the depicted embodiment of FIG. 1A, the local computing system 120 is communicatively connected to display device 180 via transmission link 115 (which may be wired or tethered, such as via one or more cables as illustrated in FIG. 1B, or instead may be wireless). In other embodiments, the local computing system 120 may provide encoded image data for display to a panel display device 182 (e.g., a TV, console or monitor) via a link 116, whether in addition to or instead of the HMD device 180, and the display devices 180 and/or 182 each includes one or more addressable pixel arrays that are graphically depicted within FIG. 1A in a manner intended for clarity rather than accuracy of scale (each pixel of a typical pixel-based display is, for example, commonly measured in micrometers). In various embodiments, the local computing system 120 may include (as non-limiting examples) a general purpose computing system; a gaming console; a video stream processing device; a mobile computing device (e.g., a cellular telephone, PDA, or other mobile device); a VR or AR processing device; or other computing system.

In the illustrated embodiment, the local computing system 120 has components that include one or more general hardware processors (e.g., centralized processing units, or "CPUs") 125; memory 130; various I/O ("input/output") hardware components 127 (e.g., a keyboard, a mouse, one or more gaming controllers, speakers, microphone, IR transmitter and/or receiver, etc.); a video subsystem 140 that includes one or more specialized hardware processors (e.g., graphics processing units, or "GPUs") 144 and video memory (VRAM) 148; computer-readable storage 150; and a network connection 160. Also in the illustrated embodiment, an embodiment of an IDTM (Image Data Transmission Manager) system 135 executes in memory 130 in order to perform at least some of the described techniques, such as by using the CPU(s) 125 and/or GPU(s) 144 to perform automated operations that implement those described techniques, and the memory 130 may optionally further execute one or more other programs 133 (e.g., to generate video or other images to be displayed, such as a game program). As part of the automated operations to implement at least some techniques described herein, the IDTM system 135 and/or other image-generating program(s) 133 executing in memory 130 may store and/or retrieve various types of data, including in the example database data structures of storage 150—in this example, the data used may include various types of image data information in database ("DB") 154, various types of application data in DB 152, various types of configuration data in DB 157, and may include additional information, such as system data or other information. The LMR system 110 is also, in the depicted embodiment, communicatively connected via one or more computer networks 101 and network links 102 to an exemplary network-accessible media content provider 190 that may further provide content to the LMR system 110 for display, whether in addition to or instead of the image-generating programs 133—the media content provider 190 may include one or more computing systems (not shown) that may each have components similar to those of local computing system 120, including one or more hardware processors, I/O components, local storage devices and memory, although some details are not illustrated for the server computing systems for the sake of brevity.

Figure 1C:
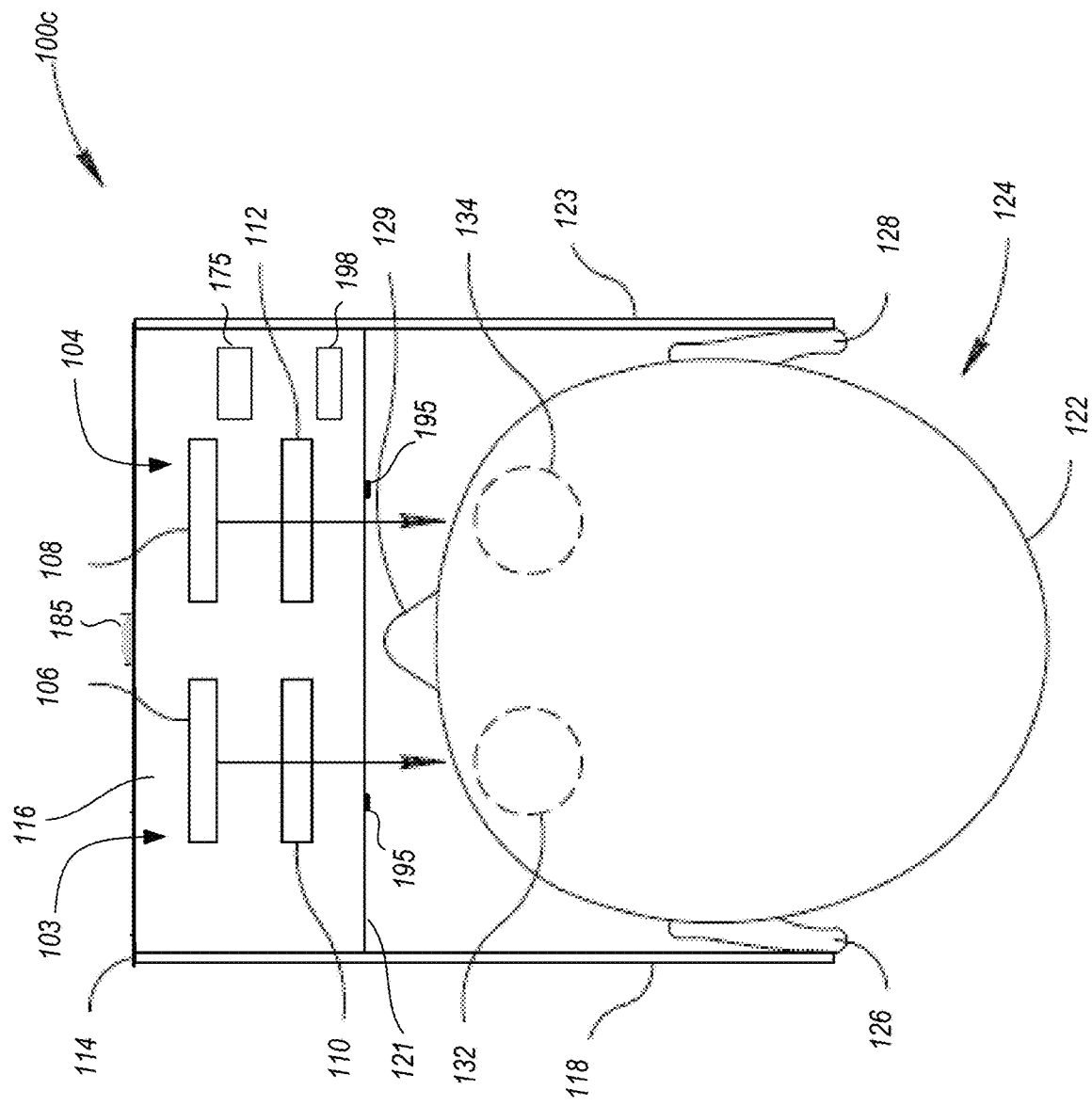
FIG. 1C is a diagram illustrating an example head-mounted display device with which at least some of the described techniques may be used.

An IDM system 184 is further illustrated as being implemented on or in conjunction with the display device 180 (or the display device 182), such as to receive and decode image data that is received in encoded form over the connection 115 from the local computing system 120. FIG. 1C illustrates one example of a head-mounted display device 180 that includes hardware circuitry to perform such image decoding techniques, as discussed further below. It will be appreciated that, while the display device 180 and/or display device 182 are depicted as being distinct and separate from the local computing system 120 in the illustrated embodiment of FIG. 1A, in certain embodiments some or all components of the local media rendering system 110 may be integrated and/or housed within a single device, such as a mobile gaming device, portable VR entertainment system, etc.—in such embodiments, transmission links 115 and/or 116 may, for example, include one or more system bus and/or video bus architectures.

As one example involving operations performed locally by the local media rendering system, assume that local computing system 120 is a gaming computing system, such that application data 152 includes one or more gaming applications executed via CPU 125 using memory 130, and that various video frame display data is generated and/or processed by the IDTM system 135, such as in conjunction with GPU 144 of the video subsystem 140. In order to provide a quality gaming experience, a high volume of video frame data (corresponding to high image resolution for each video frame, as well as a high "frame rate" of approximately 60-180 of such video frames per second) is generated by the local computing system and provided via transmission link 115 to the display device 180.

It will also be appreciated that computing system 120 and display device 180 are merely illustrative and are not intended to limit the scope of the present invention. The computing system may instead include multiple interacting computing systems or devices, and may be connected to other devices that are not illustrated, including through one or more networks such as the Internet, via the Web, or via private networks (e.g., mobile communication networks, etc.). More generally, a computing system or other computing node may comprise any combination of hardware or software that may interact and perform the described types of functionality, including, without limitation, desktop or other computers, game systems, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. The display device 180 may similarly include one or more devices with one or more display panels of various types and forms, and optionally include various other hardware and/or software components. In addition, the functionality provided by the IDTM system 135 and/or the IDM system 184 may in some embodiments be distributed in one or more components, and in some embodiments some of the functionality of the system 135 and/or system 184 may not be provided and/or other additional functionality may be available. It will also be appreciated that, while various items are illustrated as being stored in memory or on storage while being used, these items or portions of them may be transferred between memory and other storage devices for purposes of memory management and data integrity. Thus, in some embodiments, some or all of the described techniques may be performed by hardware means that include one or more processors or other configured hardware circuitry and/or memory and/or storage, such as when configured by one or more software programs (e.g., by the system 135 and/or it components) and/or data structures (e.g., by execution of software instructions of the one or more software programs and/or by storage of such software instructions and/or data structures). Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIG. 1B illustrates an example environment 100b in which at least some of the described techniques are used with an example HMD device 112 that is tethered to a video rendering computing system 142 via a wired tether 145 to provide a virtual reality display to a human user 113, although in other embodiments the HMD device may perform some or all interactions with computing system 142 via a wireless connection (not shown). The user wears the HMD device and receives displayed information via the HMD device from the computing system of a simulated environment different from the actual physical environment, with the computing system acting as an image rendering system that supplies images of the simulated environment to the HMD device for display to the user, such as images generated by a game program (not shown) and/or other software program (not shown) executing on the computing system. The user is further able to move around the actual physical environment in this example, and may further have one or more I/O ("input/output") devices to allow the user to further interact with the simulated environment, which in this example includes hand-held controllers 111. An embodiment of the IDTM system (not shown) on the computing system may encode the image data to be transmitted to the HMD device over the tether cable, based at least in part on reducing the amount of data transmitted to the HMD device, and an embodiment of the IDM system (not shown) on the HMD device may decode the received data and use it to control the display of information on one or more display panels of the HMD device.

As the user moves location and/or changes orientation of the HMD device, the position of the HMD device is tracked, such as to allow a corresponding portion of the simulated environment to be displayed to the user on the HMD device, and the controllers 111 may further employ similar techniques to use in tracking the positions of the controllers (and to optionally use that information to assist in determining and/or verifying the position of the HMD device). After the tracked position of the HMD device is known, corresponding information is transmitted to the computing system 142 via the cable 145, which uses the tracked position information to generate one or more next images of the simulated environment to display to the user. In addition, while not illustrated here, the HMD device may further include eye and/or pupil tracking sensors to determine a direction of the user's gaze, which information may similarly be transmitted to the computing system 142 via the cable 145, so that an embodiment of the IDTM system on the computing system may use that information as part of encoding the images sent to the HMD device, such as for determining a primary and/or secondary regions of the image(s). Other factors may be used as part of determining how to encode the data, including what portions of the image to use as primary and/or secondary regions, as discussed in greater detail elsewhere herein.

FIG. 1C is a simplified top plan view of an HMD device 100c that includes a pair of near-to-eye display systems 103 and 104, such as may be used in the examples of FIGS. 1A-1B or otherwise used with the described techniques. The near-to-eye display systems 103 and 104 include display panels 106 and 108, respectively (e.g., OLED or LCD micro-displays), and respective optical lens systems 110 and 112 that each have one or more optical lenses. The display systems 103 and 104 may be mounted to frame 114, which includes a front portion 116, a left temple 118, right temple 123 and interior surface 121 that touches or is adjacent to a face of a wearer user 124 when the HMD device is worn by the user. The two display systems 103 and 104 may be secured to the frame 114 in an eye glasses arrangement which can be worn on the head 122 of the wearer user 124. The left temple 118 and right temple 123 may rest over the user's ears 126 and 128, respectively, while a nose assembly (not shown) of the interior surface 121 may rest over the user's nose 129. The frame 114 may be shaped and sized to position each of the two optical systems 110 and 112 in front of one of the user's eyes 132 and 134, respectively. Although the frame 114 is shown in a simplified manner similar to eyeglasses for explanatory purposes, it should be appreciated that other structures (e.g., goggles, integrated headband, helmet, straps, etc.) may be used to support and position the display systems 103 and 104 on the head 122 of user 124. The HMD device 100c of FIG. 1C is capable of presenting a virtual reality display to the user 124, such as via corresponding video presented at a display rate (e.g., 30, 60, 90, 180, etc. frames or images per second), while other embodiments of a similar system may present an augmented reality display to the user 124 in a similar manner. Each of the displays 106 and 108 may generate light which is transmitted through and focused by the respective optical systems 110 and 112 onto the eyes 132 and 134, respectively, of the user 124. While not illustrated here, each of the eyes will typically include a pupil aperture through which light passes into the eye, with the light entering the user's pupils is seen by the user 124 as images and/or video.

In the illustrated embodiment, the HMD device 100 further includes hardware sensors and additional components that may be used by disclosed embodiments as part of the described techniques. The hardware sensors in this example include one or more accelerometers and/or gyroscopes 198 (e.g., as part of one or more IMU units)—as discussed in greater detail elsewhere herein, values from the accelerometer(s) and/or gyroscopes may be used to locally determine an orientation of the HMD device. In addition, the HMD device 100c may include one or more front-facing cameras, such as camera(s) 185 on the exterior of the front portion 116, and whose information may be used to capture images of the actual physical environment in front of the HMD device (such as for providing AR functionality). The hardware sensors in the illustrated embodiment further include one or more sensors or other components 195 for tracking the user's pupil/gaze, such as located on the interior surface 121 near the optical lens systems 110 and 112, although in other embodiments such sensors may be on or near the display panels 106 and/or 108 to track the pupil (s)/gaze through the optical systems 110 and/or 112, respectively—as discussed in greater detail elsewhere herein, information from the components 195 may be used to identify a particular view of a simulated environment to display to the user, such as based on a direction of the user's gaze in combination with other information about a position (e.g., location and orientation) of the HMD device, as well as to determine a portion of an image that is a current focus of the user (e.g., to use in selecting a primary region of the image). Furthermore, the HMD device 100 may include other components 175, such as one or more of the following: configured hardware circuitry (not shown) to implement an embodiment of IDM system, as discussed elsewhere herein; a wired and/or wireless input port to receive image data for display via a cabled tether and/or wireless connection, such as from a video rendering system (not shown) or other source; internal storage; one or more batteries; position tracking devices to interact with external base stations; etc., as discussed in greater detail elsewhere herein. Other embodiments may not include one or more of the components 175, 185, 198 and/or 195. While not illustrated here, some embodiments of such an HMD may include various additional internal and/or external sensors, such as to track various other types of movements and position of the user's body, etc.

While the described techniques may be used in some embodiments with a display system similar to that illustrated in FIG. 1C, in other embodiments other types of display systems may be used, including with a single optical lens and display device, or with multiple such optical lenses and display devices. Non-exclusive examples of other such devices include cameras, telescopes, microscopes, binoculars, spotting scopes, surveying scopes, etc. In addition, the described techniques may be used with a wide variety of display panels or other display devices that emit light to form images, which one or more users view through one or more optical lens. In other embodiments, the user may view one or more images through one or more optical lens that are produced in manners other than via a display panel, such as on a surface that reflects light from another light source in part or in whole.

Figure 2A:
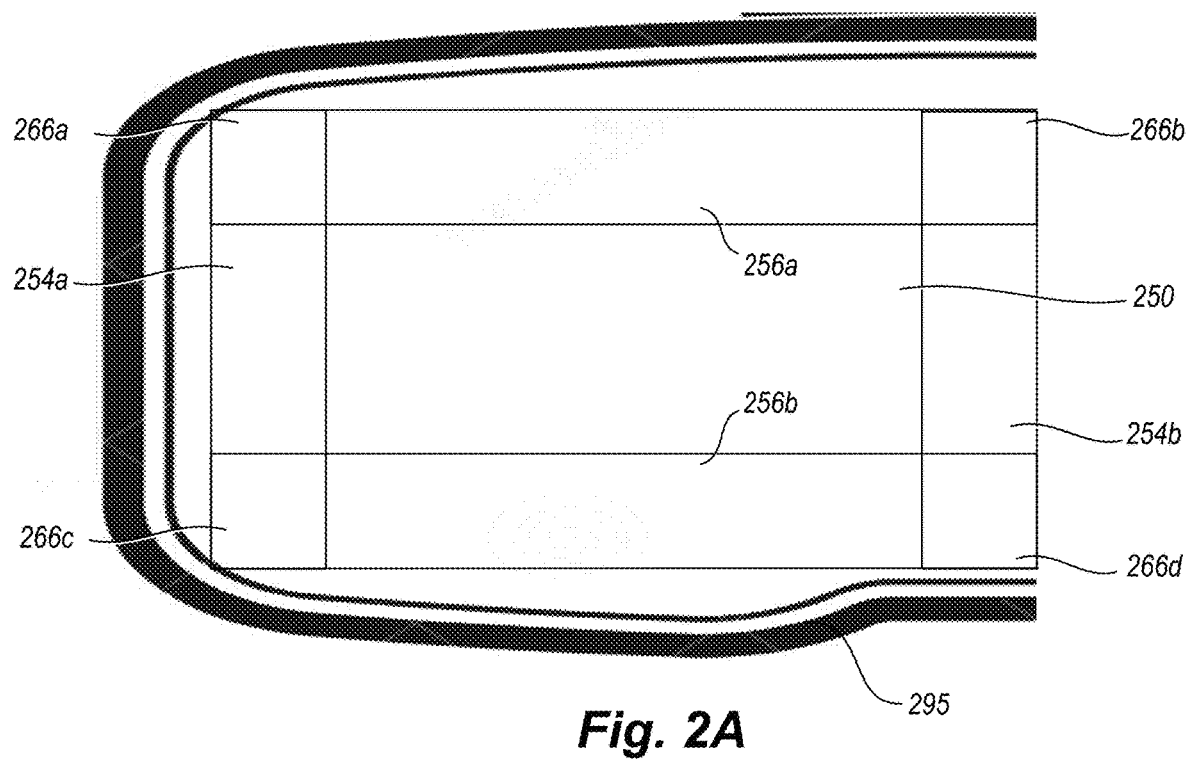

FIG. 2A illustrates a portion of a display panel for use in displaying images in accordance with one embodiment of techniques described herein. In particular, FIG. 2A depicts use of the described techniques with one display panel of a head-mounted display device 295—in this example, the display panel includes a pixel array (not shown) used to display pixel values for an image that has been encoded into a primary region 250, secondary regions 254 (including regions 254a and 254b) and 256 (including regions 256a and 256b), and tertiary regions 266 (including regions 266a, 266b, 266c and 266d). Secondary regions 256a and 256b are respectively located between the primary region and the top and bottom edges of the pixel array, secondary regions 254a and 254b are respectively located between the primary region and the right and left edges of the pixel array, and tertiary regions 266a-d are respectively located in the corners of the pixel array and delineate the four junctions of the secondary regions 254 and 256. In other embodiments, some or all of regions 266a-d may instead be treated as secondary regions as well, as discussed elsewhere herein.

FIG. 2B continues the example of FIG. 2A, and as discussed further below, the image data in the primary region 250 may be encoded and transmitted in a manner to allow it to be displayed at a highest first resolution (e.g., full resolution), the image data in the secondary regions may be encoded and transmitted in a manner to allow it to be displayed at one or more lower resolutions (e.g., with green color data in the secondary regions displayed at a second resolution lower than the first resolution, and red and blue color data in the secondary regions displayed at one or more third resolutions lower than the second resolution), and the image data in tertiary regions may be encoded and transmitted in a manner to allow it to be displayed at a lowest resolution (or not displayed at all). In embodiments and situations in which the image is an HDR image that includes HDR luminance values (e.g., to each control intensity or brightness of an associated pixel with red, green and blue sub-pixels), also referred to at times as HDR exponent data, at least some of the HDR luminance values (e.g., those associated with pixels in the secondary regions) may be encoded and transmitted at a compression level higher than that of some or all of the color data (e.g., such that it will be displayed after being decoded at a level corresponding to a fourth resolution lower than the one or more third resolutions).

In particular, FIG. 2B illustrates two pixel arrays 210 and 211 in secondary region 254b, as well as illustrating corresponding image data before the IDTM system encodes the data, and resulting information after the encoding, as well as an additional pixel array 212 in tertiary region 266c. Pixel array 211 represents image data for a green color channel, and pixel array 210 represents image data for a red or blue color channel—while the two pixel arrays 210 and 211 are illustrated as corresponding to separate portions of the image within secondary region 254b, they could instead represent the same portion of the image, but use the different respective color channel image data for that single portion.

With respect to pixel array 210 representing image data for a red or blue color channel, illustration 210b provides an enlarged display of the 8×8 pixel array 210 that is to be encoded at a resolution specific to the red or blue color channel in the secondary regions, as well as a small number of additional surrounding pixels to be separately encoded (not shown). Consider the upper right 4×2 (4 columns and 2 rows) portion of the pixel array 210, which is shown in enlarged form 225 to illustrate example values for each of the pixels. If, for example, the pixel array 210 corresponds to a red color channel in which each pixel has a value between 0 and 255 representing an intensity of red with which to display that pixel, the example red pixel values in the 4×2 array 225 vary from 040 to 200, with other pixel values (not shown) in the larger pixel array 210 having other values from the 0 to 255 range.

The 4×4 encoded pixel array 215 represents a compressed and encoded version of the 8×8 pixel array 210, so as to reduce the quantity of pixel values that are encoded by a factor of 4, as well as to reduce the amount of color data to be encoded by selecting 4 possible pixel values and representing each pixel value in the encoded pixel array 215 with a corresponding mapped value of 0-3. As part of the encoding, each 2×2 pixel sub-array in the 8×8 pixel array 210 is first reduced to a single pixel value that is one of the four possible pixel values, and the corresponding mapped value is then used to represent it in the encoded pixel array 215. Consider, for example, the 2×2 pixel sub-array 225a having example values of "042", "074", "040" and "056". A single representative pixel value for pixel sub-array 225a may be selected in various manners, such as down sampling, averaging, subsampling, picking a single one of the 4 values, using a convolution or other image processing technique, etc. In this example, a representative pixel value for the 2×2 pixel sub-array 225a is picked by averaging the actual pixel values in 225a to reach a pixel value of 53, and an average representative pixel value for the second 2×2 pixel sub-array 225b with example pixel values of "200", "150", "245" and "141" is similarly determined to be 184. To further reduce the size of the image data that is encoded, a defined number of possible pixel values is determined, and the average representative pixel value for each 2×2 pixel sub-array is further rounded to the nearest possible pixel value. In this example, the number of possible pixel values is selected to be 4, which are determined by taking the minimum actual pixel value in the 8×8 pixel array 210, the maximum actual pixel value in the 8×8 pixel array 210, and interpolating two intermediate pixel values between the minimum and maximum values. As shown in information 220, the encoding matrix for the 8×8 pixel array 210 in this example results in "040" as the minimum value (e.g., from the 2×2 pixel sub-array 225a), "250" as the maximum value (e.g., from part of the 8×8 pixel array 210 other than the sub-arrays 225a and 225b), and "110" and "180" as the two interpolated intermediate values—these 4 possible values are then assigned to values 0, 1, 2 and 3 from smallest to largest possible pixel value, respectively, resulting in each average representative pixel value being represented in the 4×4 encoded pixel array 215 with only 2 bits, such that all pixel values for encoded pixel array 215 can be stored in 32 bits. In this particular example, the average representative pixel value of 53 for the first 2×2 pixel sub-array 225a is rounded to minimum value 40 and encoded with a "0" in the encoded pixel array 215 (as shown in the third column of the first row), and the average representative pixel value of 184 for the second 2×2 pixel sub-array 225b is rounded to interpolated value 180 and encoded with a "2" in the encoded pixel array 215 (as shown in the fourth column of the first row). Each of the other pixel values in the 4×4 encoded pixel array 215 are similarly determined, and those values are stored in the resulting modified encoding image data along with information for use in reconstructing the 4 possible pixel values corresponding to the encoded values at a time of decoding (e.g., by storing the actual minimum and maximum values). This process is then repeated for each 8×8 pixel array in the secondary regions, and is further done separately for each of the red and blue color channels in this example.

When the corresponding encoded image file is later decoded and displayed, the 4×4 encoded pixel array 215 for the red or blue color channel of the 8×8 pixel array 210 is used to generate a new 8×8 pixel array to be displayed, such as by converting each of the mapped values 0-3 back to one of the 4 possible pixel values 040, 110, 180 or 250, and then setting a 2×2 block of pixels in the decoded image to that possible pixel value. A similar process is performed for each other 4×4 encoded pixel array in the encoded compressed image file for the red and blue color channels in the secondary regions. Thus, the 4×4 encoded pixel array 215 illustrates an example encoded version of the 8×8 pixel array 210 for the red or blue color channels, resulting in a lowered resolution than the original 8×8 pixel array 210 when decoded and displayed.

In a similar manner to 8×8 pixel array 210 and the 4×4 encoded pixel array 215, the 4×4 encoded pixel array 216 illustrates an example encoded version that is generated using the 8×8 pixel array 211 for the green color channel—however, in contrast to pixel arrays 210 and 215, the 4×4 encoded pixel array 216 represents only a corresponding 4×4 pixel sub-array of the 8×8 pixel array 211, such that the entire 8×8 pixel array 211 is represented by 4 such 4×4 encoded pixel arrays (with the other 3 such 4×4 encoded pixel arrays for the 8×8 pixel array 211 not shown in this example). In this manner, the 4 such 4×4 encoded pixel arrays for the 8×8 pixel array 211 do not reduce the total number of pixel values in encoded compressed image file, but do reduce the amount of color data that is encoded by similarly using only 4 possible pixel values that are mapped to corresponding values 0-3 in the 4×4 encoded pixel arrays. In this example, information 221 illustrates the encoding matrix for the 8×8 pixel array 211 with "005" as the minimum value mapped to value "0", "245" as the maximum value mapped to value "3", and "085" and "165" as the two interpolated intermediate values mapped to values "1" and "2", respectively. While only one of the four 4×4 encoded pixel arrays for the 8×8 pixel array 211 is shown, this process is repeated for each of the other three corresponding 4×4 pixel sub-arrays of the 8×8 pixel array 211, and is then further repeated for each 8×8 pixel array in the secondary regions for the green color channel.

When the corresponding encoded image file is later decoded and displayed, the 4×4 encoded pixel array 216 for a corresponding 4×4 pixel sub-array of the 8×8 pixel array 211 for the green color channel is used to generate a new 4×4 pixel array to be displayed, such as by converting each of the mapped values 0-3 back to one of the 4 possible pixel values 005, 085, 165 or 245, and then setting a single pixel in the decoded image to that possible pixel value. A similar process is performed for each other 4×4 encoded pixel array in the encoded compressed image file for the green color channel in the secondary regions. Thus, the 4×4 encoded pixel array 216 illustrates an example encoded version of the corresponding 4×4 pixel sub-array of the 8×8 pixel array 211 for the green color channel, resulting in a lowered resolution than the original corresponding 4×4 pixel sub-array of the 8×8 pixel array 211 when decoded and displayed, but at a resolution level higher than that of the red and blue color channels for the secondary regions (since the quantity of encoded pixel values has not been reduced relative to the original).

The 4×4 encoded pixel array 217 further represents one example for how pixel values in tertiary regions may be encoded to reduce the size of the data, although in other embodiments the data from such tertiary regions may be discarded entirely and not included in the encoded compressed image. In this example, a representative 4×4 pixel array 227 from pixel array 212 of tertiary region 266c is shown, with varying actual pixels values represented abstractly as "N", "L", "J" and "K" but each representing a value in the 0-255 range for any of the red, blue or green color channels—the actual pixel values are discarded and each changed to "0" in the 4×4 encoded pixel array 217, so that no additional color data needs to be stored in the encoded compressed image While only one 4×4 encoded pixel array for the tertiary regions are shown, this process may be repeated throughout the tertiary region(s) and for each of the red, blue and green color channels. When the corresponding encoded image file is later decoded and displayed, the data from the 4×4 encoded pixel array 217 may be discarded and not used in setting corresponding pixels in the display panel, or instead those pixels may all be set to the value of 0.

While the example of FIG. 2B discusses performing different encodings and resolutions for different colors in at least some regions, such as in secondary regions and for green color data to be encoded for use at a higher resolution than red or blue color data, it will be appreciated that other embodiments may use different types of encodings and/or resolutions. In some embodiments, red, green and blue color data may each have the same encoding and resolution, and in other embodiments red, green and blue color data may each have different encodings and resolutions—furthermore, while green color data is encoded at a higher resolution in this example, in other embodiments red and/or blue color data may be encoded at a higher resolution that green color data. Thus, other types of encodings and resolutions are contemplated, as discussed further elsewhere herein.

While not illustrated in FIG. 2B, the image being encoded may be an HDR image that also includes HDR luminance values, such as, for example, an image in an RGBE format in which each pixel is represented using one byte for each of red, green and blue sub-pixels and using one byte for a shared HDR exponent (for 4 bytes total). The HDR exponent luminance values may each, for example, have a value between 0 and 100, and be stored in an array with each HDR exponent luminance value being associated with corresponding RGB sub-pixel values for an associated pixel. As one example of encoding such HDR exponent luminance values, consider an 8×8 array associated with pixel array 210, but which instead contains 64 HDR exponent luminance values that each correspond to one of the pixel values in array 210 (and to corresponding pixels in two other such 8×8 pixel arrays for the two other color channels). However, while the 8×8 pixel array 210 is compressed to a 4×4 encoded pixel array 215 in this example (thus reducing the quantity of pixel values by a factor of 4), the example 8×8 array of HDR exponent luminance values may, in at least some embodiments, be compressed to a 2×2 encoded HDR luminance value array (thus reducing the quantity of HDR luminance values by a factor of 16). While the compression may be performed in various manners in various embodiments, in at least some embodiments the compression is performed in an analogous manner to that described for the color pixel values of array 210. For example, with respect to the example 8×8 array of HDR exponent luminance values, initial values for a 2×2 encoded HDR exponent luminance value array (analogous to the 4×4 encoded pixel array 215) may be determined by converting each of four 4×4 sub-arrays of the example 8×8 HDR exponent luminance value array into a single HDR exponent luminance value, such as by averaging or one of various other techniques noted above. In some such embodiments, an encoding matrix similar to that of information 220 may be further generated and used to replace the initial values for the 2×2 encoded HDR exponent luminance value array with values from a subset of one or more possible HDR exponent luminance values (e.g., by determining lowest and highest HDR exponent luminance values in the example 8×8 HDR exponent luminance value array, optionally interpolating two intermediate HDR exponent luminance values between them, assigning the two or four possible HDR exponent luminance values to encoding values such as 0 and 1 or 0-3, and replacing each of the initial values for the 2×2 encoded HDR exponent luminance value array with the encoding value for a closest corresponding one of the two or four possible HDR exponent luminance values). This process is then repeated for each 8×8 HDR exponent luminance value array in at least the secondary regions (and in some embodiments in the primary region(s) as well). Thus, the resulting 2×2 encoded HDR exponent luminance array is encoded using more compression than that of the 4×4 encoded pixel arrays 215 and 216, resulting in lower resolution when decoded and displayed.

Figure 2C:
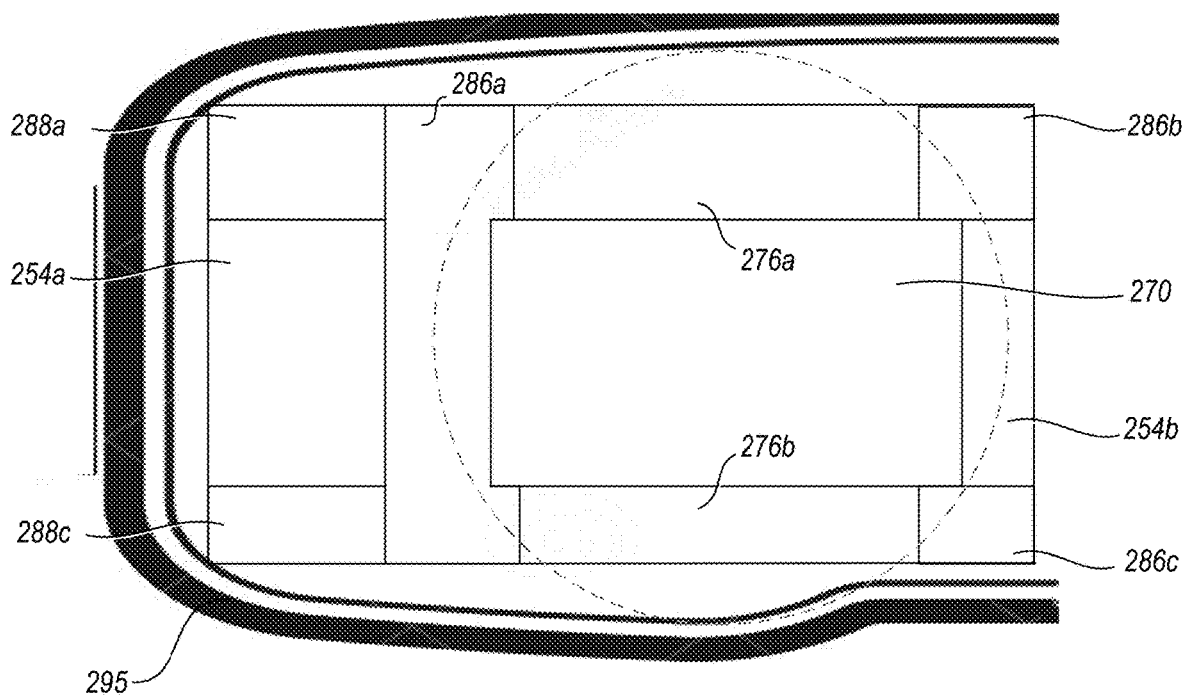

FIG. 2C continues the examples of FIGS. 2A-2B, and in particular illustrates an alternative encoding of primary, secondary and tertiary regions, such as for a different image than is represented in FIG. 2A. In particular, the primary region 270 of FIG. 2C is no longer centered, such as to reflect an actual or expected gaze of the wearer user, and the secondary and tertiary regions are correspondingly offset from the center, as well as being of different sizes and shapes. In addition, the circle 254b of FIG. 2C represents a subset of the display panel that may be visible to the viewer user, such as due to the optical system in use. In this example, since the circle 254b does not include any of regions 288a, 288c or 254a, those regions are dynamically selected as tertiary regions for this image, and may not have any data encoded (in a manner similar to that of regions 266a-266d of FIG. 2A). The other regions 286a-286c, 276a-b and 254b are outside the primary region 270 but are as least partially visible within the circle 254b, and thus are dynamically selected as secondary regions for this image. Once the primary, secondary and tertiary regions are determined, the pixel values in them may be encoded and decoded in a manner similar to that discussed with respect to FIG. 2B, or may instead by encoded in a different manner.

It will be appreciated that the details of FIGS. 2A-2C are provided for example purposes only, and that various other types of encoding and decoding schemes may be used, as well as that varying the amount of reduction from original pixel array to encoded pixel array and the number of possible pixel values may result in differing amounts of data size reduction and corresponding resolution reduction. As one example, HDR exponent data may be included at an amount of reduction that is different from the amount of reduction for some or all of the RGB color channels. In addition, the illustrated examples of FIGS. 2A-2C utilize image partitioning arrangements comprised of rectangular partitions of the representative video frame. However, it will be appreciated that various alternative partition shapes may be utilized without departing from the intended scope of the presented techniques. For example, in certain embodiments circular or ellipsoidal primary regions may be utilized, with the remaining portion of the display pixel array being partitioned into one or more secondary regions in accordance with a relative distance from the primary region, from one or more edges of the displayed pixel array, or other manner.

FIG. 3 is a flow diagram of an example embodiment of an Image Data Transmission Manager routine 300. The routine 300 may be performed by, for example, the Image Data Transmission Manager system 135 of FIG. 1A and/or a system performing operations for encoding image data as discussed with respect to FIGS. 2A-2C and elsewhere herein, such as to encode image data to reduce bandwidth of image data transmission to the display panel via use of color-specific compression in peripheral regions of an image. While the illustrated embodiment of the routine 300 discusses performing operations for a single image at a time, it will be appreciated that the operations of the routine 300 may be applied to sequences of multiple images (e.g., multiple consecutive video frames). It will also be appreciated that the illustrated embodiment of the routine may be implemented in software and/or hardware as appropriate, and may be performed by, for example, a system operating on a computing system to transfer image data to an associated HMD device.

The illustrated embodiment of the routine 300 begins at block 305, where the routine obtains image data and information about a display panel on which to display that image data. In block 310, the routine identifies the regions to use for encoding the data, such as by receiving information about the arrangement to use in block 305 (e.g., a fixed structure to use for all images), or instead by dynamically determining the structure to use based on current context (e.g., received information about a portion of the image of emphasis, such as from gaze tracking of a viewer, information from a program generating or otherwise providing the image, etc.). In particular, the routine in block 310 identifies at least one primary region of the image and at least one secondary region outside the primary region, as well as optionally identifying one or more tertiary regions. In block 315, the routine then initiates creation of a modified copy of the image that is an encoded compressed version of the original, optionally performing the generation of the encoded compression version simultaneously with generation of the original image to be encoded or with receiving portions of that original image.

After block 315, the routine proceeds to perform a loop of blocks 320 to 385 to complete the generation of the encoded compressed image file. In block 320, the routine receives a block of image pixel values for a color channel, such as an 8×8 block of image pixel values as discussed with respect to FIG. 2B. In block 325, the routine then determines the type of region to which the block belongs, continuing to blocks 330, 340 or 335 for region types of primary, secondary or tertiary, respectively. In block 330 for a primary region block, the routine retains all of the image pixel values in the encoded compressed copy being generated, although in other embodiments may compress the pixel values using a lossless compression scheme. In block 335 for a tertiary region block, the routine removes some or all of the corresponding image pixel value information from the encoded compressed copy being generated, such as to remove all color data in a manner similar to that illustrated in FIG. 2B, or instead to discard the region pixel values entirely in other embodiments for the encoded compressed copy being generated.

In block 340 for a secondary region block, the routine determines in routine block 340 the color channel to which the pixel block belongs, continuing to block 345 for the color channel of green or to block 350 for the color channels or red or blue. In block 345 for the green color channel, the block is separated into multiple sub-blocks that will each be separately encoded, such as 4 such 4×4 pixel sub-arrays in a manner similar to that illustrated in FIG. 2B. Conversely, in block 350 for the red or blue color channels, the block is reduced into a smaller single sub-block via average resampling, such as a quarter-size 4×4 pixel sub-block as illustrated in FIG. 2B. In at least some embodiments, the multiple pixel sub-blocks generated in routine block 345 and the single pixel sub-block generated in routine block 350 are of the same size. After blocks 345 or 350, the routine continues to block 360 where, for each sub-block generated in routine blocks 345 or 350, the routine encodes pixel values for the encoded compressed copy being generated by determining minimum and maximum pixel values for the pixel block received in routine block 320 and by further determining two intermediate pixel values between them via interpolation, by mapping the 4 determined possible pixel values to corresponding identifiers (e.g., values 0-3), and then replacing each sub-block pixel value with the corresponding identifier for a closes one of the 4 determined possible pixel values, as well as storing the color data for the identifiers (e.g., storing the minimum and maximum possible pixel values).

After blocks 345, 350 or 360, the routine continues to routine block 385 to determine if there are more pixel blocks in the original image to encode, and if so returns to routine block 320 to receive a next such pixel block. Otherwise, the routine continues to block 390 to optionally further compress the generated encoded compressed image file on an overall basis, and to store and/or transmit the resulting encoded compressed image file to a device with a display panel on which the image is to be displayed.

After block 390, the routine continues to block 395 to determine whether to continue, such as until an explicit indication to terminate is received. If it is determined to continue, the routine returns to block 305 to obtain image data for a next image to encode, and if not the routine proceeds to block 399 and ends.

Figure 4:
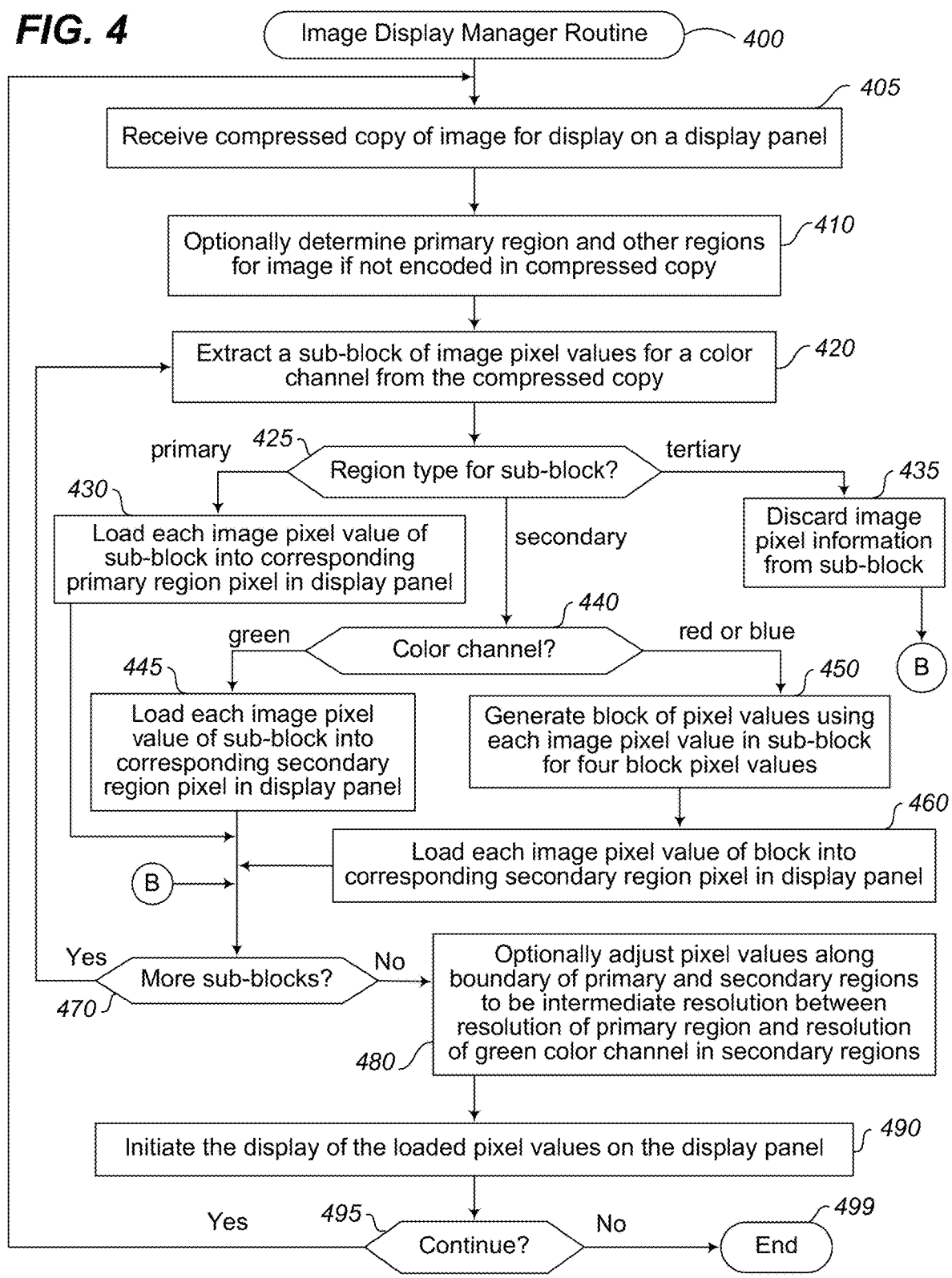
FIG. 4 is a flow diagram of an example embodiment of an Image Display Manager routine.

FIG. 4 is a flow diagram of an example embodiment of an Image Display Manager routine 400. The routine 400 may be performed by, for example, the Image Display Manager component 184 of FIG. 1A and/or a system performing operations for receiving, decoding and displaying image data that is encoded and compressed as discussed with respect to FIGS. 2A-2C and elsewhere herein. While the illustrated embodiment of the routine 400 discusses performing operations for a single image at a time, it will be appreciated that the operations of the routine 400 may be applied to sequences of multiple images (e.g., multiple consecutive video frames). It will also be appreciated that the illustrated embodiment of the routine may be implemented in software and/or hardware as appropriate, and may be performed by, for example, one or more processors or other configured hardware circuitry on an HMD or on another separate computing device.

The illustrated embodiment of the routine 400 begins at block 405, where encoded compressed image data information is obtained for display on a display panel, such as encoded compressed image data generated and transmitted by an Image Data Transmission Manager system as discussed with respect to FIG. 3. In block 410, the primary region and other regions for the image may be determined, such as based on receiving such information encoded in the image (e.g., for situations in which the structure may dynamically change for different images), by using predefined region information that does not change, or by otherwise determining the region information. If the encoded compressed file had an overall compression applied, such as with respect to block 390 of FIG. 3, the corresponding overall decompression is also performed before performing further color-specific decompression for secondary regions of the image.

After block 410, the routine continues to perform a loop of blocks 420 to 470 to decode the received image data and prepare a resulting new image for display, with differing color-specific resolutions in peripheral regions of the image. In particular, the routine extracts a sub-block of image pixel values for a color channel from the encoded compressed image, such as a 4×4 image pixel array as discussed in FIGS. 2B and 3. In block 425, the routine then determines the type of region to which the sub-block belongs, continuing to blocks 430, 440 or 435 for region types of primary, secondary or tertiary, respectively. In block 430 for a primary region block, the routine uses all of the image pixel values in the sub-block, by loading each image pixel value into a corresponding primary region pixel in the display panel. In block 435 for a tertiary region sub-block, the routine discards any corresponding pixel information from the sub-block.

In block 440 for a secondary region sub-block, the routine determines the color channel to which the sub-block belongs, continuing to block 445 for the color channel of green or to block 450 for the color channels or red or blue. In block 445 for the green color channel, each pixel value of the sub-block is changed from the stored mapped value to a corresponding one of a limited number (e.g., 4) possible pixel values, and that possible pixel value is loaded into a corresponding secondary region pixel in the display panel. Conversely, in blocks 450 and 460 for the red or blue color channels, each pixel value of the sub-block is changed from the stored mapped value to a corresponding one of a limited number (e.g., 4) possible pixel values, and a 4 times larger block of pixel values is then created by loading that possible pixel value into 4 corresponding secondary region pixels in the display panel. After blocks 430, 445 or 460, the routine continues to routine block 470 to determine if there are more sub-blocks to decode and display, and if so returns to routine block 420 to obtain a next such sub-block.

If it is instead determined in routine block 470 that there are no more sub-blocks to decode, the routine continues to block 480 to optionally adjust pixel values that are loaded in display panel pixels along the boundary of the primary and secondary regions, so as to smooth a transition from the full resolution of the primary region to the lower resolution(s) of the secondary region(s). After block 480, the routine continues to block 490 to initiate the display of the loaded pixel values on the display panel.

After block 490, the routine continues to block 495 to determine whether to continue, such as until an explicit indication to terminate is received. If it is determined to continue, the routine returns to block 405 to obtain image data for a next image to encode, and if not the routine proceeds to block 499 and ends.

As noted above, the described techniques may be used in some embodiments to address performance of HMD devices, which use optical lenses to provide for reduction of the distance between a user's eye and the display, and which may optionally have relatively high refresh rates and low latency to prevent motion sickness in the user. When viewed through the lens of an HMD, pixels that are uniform in size and form are spatially distorted at the periphery, such that image data is not consistently dense across the user's field of view, and resulting in reduced efficiency when transmitting image data using methods intended for conventional displays.

Various forms of additional compression/decompression techniques may be used in some embodiments to provide efficient data transmission, such as by doing one or more such additional compression techniques in addition to (e.g., after) use of the compression and encoding discussed above, although in other embodiments the use of the compression and encoding discussed above replaces possible use of some or all such additional compression/decompression techniques. Such additional compression techniques may, for example, utilize chroma subsampling in YUV color space, whereby image data is separated into luma and chrominance components and the chrominance data is reduced in density, based on human eyes being more sensitive to variation in light intensity than to variation in color, as well as typically high correlation among the intensity in red, green and blue color channels. However, this approach can produce unsuitable results in an HMD device where displays provide images that compensate for chromatic aberration created by the optical lens, as such compensated images normally exhibit a higher degree of spatial separation among the RGB color channels, and this separation effectively removes much of the RGB channel correlation that YUV approaches take advantage of, and this separation also increases towards the periphery of the display where demand for improved bandwidth efficiency is high. Such additional compression techniques may also include, for example, block compression methods (e.g., running in hardware and at real-time) that are prone to banding and flickering artifacts, to which the human peripheral vision is very sensitive. Such additional compression techniques do not typically address aspects of peripheral vision, and instead are designed with the expectation that the results are viewed directly and in a non-peripheral area.

Thus, in at least some embodiments, the described techniques are directed in whole or in part toward image data that will be perceived using human peripheral vision, and to exhibit one or some or all of the following properties relative to foveal vision: lower detail sensitivity (information in the higher frequency domain, aka fine detail, is not as perceptible); high contrast sensitivity, especially at lower light levels (e.g., perceptual contrast is maintained); equivalent temporal sensitivity (e.g., peripheral image display is not delayed by processing, instead doing compression/decompression inline with a scan out and in real-time); high sensitivity to geometric spatial artifacts (e.g., to be sufficiently optically accurate to avoid sickness, such as the same or higher optically accuracy relative to the image data before encoding and decoding); higher sensitivity to first order motion (e.g., banding, sparkle, or flicker artifacts that are noticeable); lower sensitivity to color modulation (e.g., image can exhibit less chroma differentiation relative to foveal); etc. As noted above, a YUV-based method may be unsuitable under certain conditions due to not preserving chromatic aberration compensation. A modified block compression approach may provide benefits of being fast (e.g., without frame deltas or other computations that introduce significant latency, optionally implemented in hardware, etc.) and stable (e.g., has little to no geometric shifting), including to, as illustrated in the described techniques above, provide one or some or all of the following features functionality: preserve RGB channel separation and related chromatic aberration compensation; avoid banding (e.g., do not limit color values by changing from 24-bit to 16-bit color, as is done in some compression techniques); preserves more detail in some channels and less in others (e.g., more in the green channel and less in the blue); preserve less detail in HDR exponent data than for some or all of the color channels (e.g., for secondary regions); allows dynamic mixing with full uncompressed data or null data; use with fuzzy images so excessive flicker or sparkle is not added to be perceptible by peripheral vision; etc. This allows a balance to be provided (and optionally adjusted) between higher compression and more color-fringing artifacts in peripheral regions, such as to be good at preserving contrast while sacrificing some detail in peripheral regions, with significant reduction of the image data (e.g., 20%).

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that the data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

In addition, the sizes and relative positions of elements in the drawings are not necessarily drawn to scale, including the shapes of various elements and angles, with some elements enlarged and positioned to improve drawing legibility, and the particular shapes of at least some elements being selected for ease of recognition without conveying information regarding the actual shape or scale of those elements. In addition, some elements may be omitted for clarity and emphasis. Furthermore, repeated reference numbers in different drawings may signify the same or similar elements.

From the foregoing it will be appreciated that, although specific embodiments have been described herein for purposes of illustration, various modifications may be made without deviating from the spirit and scope of the invention. In addition, while certain aspects of the invention are presented at times in certain claim forms, or may not be embodied in any claims at some times, the inventors contemplate the various aspects of the invention in any available claim form. For example, while only some aspects of the invention may be recited at a particular time as being embodied in a computer-readable medium, other aspects may likewise be so embodied.

What is claimed is:

1. A method comprising:
  receiving, by one or more hardware processors, data for an image having a plurality of pixel values for display on a display panel, including target pixel values in a primary region of the image that belong to multiple color channels, first pixel values in one or more secondary regions of the image that belong to a first color channel of the multiple color channels, and second pixel values in the secondary regions that belong to a second color channel of the multiple color channels;
  generating, by the hardware processors, a compressed copy of the image to transmit to the display panel that retains the target pixel values of the primary region and reduces resolution in the secondary regions by removing at least some of the first and second pixel values in a color-specific manner, including:
    reducing, using a first compression level, first information in the compressed copy that represents the first pixel values for the first color channel, wherein the first compression level reduces a quantity of pixel values in the first information and selects each pixel value in the first information from a reduced set of first possible pixel values with less unique values than the first pixel values; and
    reducing, using a second compression level, second information in the compressed copy that represents the second pixel values for the second color channel, wherein the second compression level has less compression than the first compression level and selects each pixel value in the second information from a reduced set of second possible pixel values that has less unique values than the second pixel values without reducing a quantity of pixel values in the second information; and
  transmitting, by the hardware processors, the compressed copy of the image to the display panel to cause display of the image on the display panel.

2. The method of claim 1 wherein the reducing of the first information and the second information in the compressed copy includes:
  representing, for each of multiple blocks of the first pixel values in the image, the block in the compressed copy with a single first sub-block of smaller size whose pixel values are selected from the reduced set of first possible pixel values and each represent multiple of the first pixel values from the block; and
  representing, for each of multiple blocks of the second pixel values in the image, the block in the compressed copy with multiple second sub-blocks that in aggregate are a same size as the block and whose pixel values are selected from the reduced set of second possible pixel values.

3. The method of claim 2 further comprising using the compressed copy to display the image on the display panel, including to use each of the retained target pixel values to control display of one of first display panel pixels for the multiple color channels in an area corresponding to the primary region, and to control display of second display panel pixels in one or more areas corresponding to the secondary regions by using each pixel value in the second sub-blocks to control display of one of the second display panel pixels for the second color channel to be one of the reduced set of second possible pixel values, and by using the pixel values in the first sub-blocks to generate a larger quantity of further pixel values that each control display of one of the second display panel pixels for the first color channel to be one of the reduced set of first possible pixel values.

4. The method of claim 1 wherein the one or more hardware processors are part of a rendering system, wherein the display panel is part of a head-mounted display (HMD) device having one or more hardware circuits configured to decompress information in the compressed copy that includes at least the reduced first information and to use the decompressed information as part of controlling display of the image on the display panel, and wherein the generating of the compressed copy includes reducing a size of the compressed copy to reduce bandwidth used for transmitting the compressed copy from the rendering system to the HMD device.

5. The method of claim 4 wherein the HMD device is connected to the rendering system via a wireless connection over which the transmitting occurs, and wherein at least one of the first compression level or the second compression level are used based at least in part on one or more characteristics of the wireless connection.

6. The method of claim 4 wherein the rendering system and the HMD device are part of a gaming system, wherein the HMD device is a virtual-reality device connected to the rendering system via a tether over which the transmitting occurs, wherein the image is one of a succession of multiple video frames generated by an executing game program, and wherein the receiving and the generating and the transmitting are performed for each of the multiple video frames in succession.

7. The method of claim 4 further comprising, under control of the one or more hardware circuits, controlling display of the image on the display panel, including to display information in the primary region at a first resolution, to display information in the secondary regions for the second color channel at a second resolution lower than the first resolution, and to display information in for the secondary regions for the first color channel at a third resolution lower than the second resolution.

8. The method of claim 7 further comprising, under control of the one or more hardware circuits, generating additional information to display at a fourth resolution that is lower than the first resolution and higher than the second resolution, and displaying the additional information at the fourth resolution in an intermediate region between at least some portions of the primary and secondary regions.

9. The method of claim 1 wherein the first color channel includes at least one of a red color channel or a blue color channel, and wherein the second color channel includes a green color channel.

10. The method of claim 1 further comprising, before the generating of the compressed copy of the image, determining the primary region of the image to correspond to a direction of a gaze of a user viewing the display panel.

11. The method of claim 1 further comprising, before the generating of the compressed copy of the image, determining the primary region of the image based at least in part on a location at which identified content is shown in the image.

12. The method of claim 1 further comprising determining an amount of compression to use for the compressed copy of the image based on one or more current conditions, and performing the generating of the compressed copy to include the determined amount of compression, wherein the one or more current conditions include at least one of complexity of information in the image, load on the one or more processors, an attribute of a connection used for the transmitting, or one or more preferences of a user viewing the display panel.

13. The method of claim 1 wherein the image is constructed in a rectangular format and is displayed on the display panel with only a non-rectangular subset of the image being visible that does not include one or more tertiary regions of the image, and wherein the generating of the compressed copy includes preventing at least some pixel value information for the tertiary regions from being included in the compressed copy.

14. The method of claim 1 wherein the receiving of the data for the image includes generating the image, and wherein the generating of the compressed copy of the image is performed simultaneously with the generating of the image in a real-time manner.

15. The method of claim 1 wherein the data for the image further specifies a plurality of high dynamic range (HDR) luminance values including target HDR luminance values associated with the target pixel values and first HDR luminance values associated with the first pixel values and second HDR luminance values associated with the second pixel values, and wherein the generating of the compressed copy of the image further includes reducing, using a third compression level has less compression than the first and second compression levels, third information in the compressed copy that represents at least the first and second HDR luminance values.

16. The method of claim 15 wherein the reducing of the third information includes reducing a quantity of HDR luminance values in the third information by using each HDR luminance value in the third information to represent multiple HDR luminance values in the first and second HDR luminance values, and further includes selecting each HDR luminance value in the third information from a reduced set of possible HDR luminance values with less unique values than the first and second HDR luminance values.

17. The method of claim 15 wherein the generating of the compressed copy of the image further includes retaining all of the target HDR luminance values associated with the target pixel values, to cause non-reduced resolution of the target pixel values of the primary region and of the target HDR luminance values associated with the target pixel values upon display of the image.

18. A system, comprising:
a display panel of a head-mounted display (HMD) device having multiple pixels; and
one or more hardware circuits configured to cause the system to perform automated operations that include at least:
receiving an encoded copy with a plurality of pixel values for an image;
identifying, from the plurality of pixel values in the encoded copy, multiple pixel values of the plurality for a primary region of the image, wherein the identified multiple pixel values belong to multiple color channels and are for use in controlling pixels of the display panel corresponding to the primary region;
identifying additional first pixel values of the plurality from the encoded copy that are for one or more secondary regions of the image and that belong to at least one first color channel of the multiple color channels, wherein the additional first pixel values are each one of a reduced set of first possible pixel values that has less unique values than the multiple pixel values;
generating other pixel values for the secondary regions of the image that belong to at least one second color channel of the multiple color channels, including identifying additional second pixel values of the plurality from the encoded copy that are for the secondary regions and that belong to the at least one second color channel, and using each identified additional second pixel value to produce multiple of the other pixel values, wherein the other pixel values are each one of a reduced set of second possible pixel values that has less unique values than the multiple pixel values; and displaying the image on the display panel, including to use each of the identified additional first pixel values and generated other pixel values to control display of a pixel of the display panel corresponding to the secondary regions, and to use each of the identified multiple pixel values to control one of the pixels of the display panel corresponding to the primary region.

19. The system of claim 18 further comprising memory of a rendering system with stored instructions that, when executed by one or more hardware processors of the rendering system, cause the rendering system to generate the encoded copy and to transmit the encoded copy to the HMD device by performing further automated operations that include at least:

receiving, by the rendering system, data for the image that includes a plurality of pixel values belonging to the multiple color channels;

generating, by the rendering system, the encoded copy of the image using color-specific compression in the secondary regions, including:

retaining, in the encoded copy, pixel values of the received data in the primary region, and a size of color data for the retained pixel values;

reducing, in the encoded copy, and for additional first pixel values in the received data for the secondary regions and belonging to the first color channel, a pixel quantity and a size of color data by, for each of multiple blocks of the additional first pixel values, replacing, in the encoded copy, the block with a single first sub-block of smaller size whose pixel values are each selected from a first reduced set of possible pixel values and each represent multiple of the additional first pixel values from the block; and reducing, in the encoded copy, and for additional second pixel values in the received data for the secondary regions and belonging to the second color channel, a size of color data by, for each of multiple blocks of the additional second pixel values, replacing, in the encoded copy, the block with multiple second sub-blocks whose pixel values are each selected from a second reduced set of possible pixel values; and transmitting, by the rendering system, the encoded copy of the image to the HMD device.

20. The system of claim 19 wherein the stored instructions further cause the rendering system to execute a software application generating a sequence of multiple video frames for display on the display panel and to encode each of the multiple video frames before transmission over at least one connection to the HMD device, wherein the image is one of multiple video frames, and wherein the receiving and the identifying of the multiple pixel values and the identifying of the additional first pixel values and the generating of the other pixel values and the displaying are performed for each of the multiple video frames.

21. The system of claim 18 further comprising a second display panel of the HMD device, wherein the HMD device houses the display panel in a position viewable by one eye of a wearer of the HMD device and houses the second display panel in a position viewable by another eye of the wearer, and wherein the automated operations further include displaying a second image on the second display panel simultaneously with the displaying of the image on the display panel to provide a virtual reality display to the wearer.

22. The system of claim 18 wherein the displaying of the image on the image panel includes displaying information in the primary region at a first resolution, displaying information in the secondary regions for the first color channel at a second resolution lower than the first resolution, displaying information in the secondary regions for the second color channel at a third resolution lower than the second resolution, and generating and displaying further information at a fourth resolution that is lower than the first resolution and higher than the second resolution, wherein the displaying of the further information is performed between portions of the primary region and the secondary regions.

23. The system of claim 18 wherein the image is constructed in a rectangular format and is displayed on the display panel with only a non-rectangular subset of the image being visible that does not include one or more tertiary regions of the image, and wherein the displaying of the image on the display panel includes not displaying any pixel values from the encoded copy corresponding to the tertiary regions.

24. The system of claim 18 wherein the encoded copy further includes additional information encoding a plurality of high dynamic range (HDR) luminance values associated with the plurality of pixel values, wherein the automated operations further include:

identifying multiple of the plurality of HDR luminance values that are associated with the multiple pixel values for the primary region of the image; and generating other of the plurality of HDR luminance values from the additional information by, for each of multiple encoded HDR luminance values in the additional information, using the encoded HDR luminance value to produce multiple of the other HDR luminance values that are each one of a reduced set of possible HDR luminance values having less unique values than the multiple HDR luminance values, and wherein the displaying of the image further includes using the generated other HDR luminance values as part of controlling display of pixels of the display panel corresponding to the secondary regions, and using the identified multiple HDR luminance values to control display of pixels of the display panel corresponding to the primary region.

25. A method comprising:

receiving, by one or more hardware processors of a video rendering computing system, video frame data for an image having a plurality of pixel values in multiple color channels for display on a head-mounted display (HMD) device;

determining, by the one or more hardware processors, a primary region of the image to be displayed at full resolution and one or more secondary regions of the image to be displayed at less-than-full resolution;

encoding, by the one or more hardware processors, the image to generate a modified copy of the image for transmission to the HMD device that is compressed in the secondary regions in a color-specific manner, including:

retaining, for first pixel values of the received video frame data in the primary region, all of the first pixel values in the modified copy; and replacing, for second pixel values of the received video frame data in the secondary regions, and differently for one or more first color channels of the multiple color channels than for one or more second color channels of the multiple color channels, at least some of the second pixel values in the modified copy, by:

dividing the second pixel values into multiple blocks each having a defined first number of multiple pixel values of a single color channel;

creating smaller sub-blocks that represent the multiple blocks and that each has a second number of multiple pixel values smaller than the defined first number, including creating, for each block with pixel values of one of the first color channels, a single sub-block whose pixel values each represent two or more pixel values in the block, and further including creating, for each block with pixel values of one of the second color channels, multiple sub-blocks whose pixel values in aggregate replicate the block; and changing, for each sub-block, each pixel value in the sub-block to one of multiple allowed pixel values for the sub-block, including determining the multiple allowed pixel values for the sub-block to include minimum and maximum pixel values from the sub-block and to include one or more intermediate pixel values between the minimum and maximum pixel values;

transmitting the modified copy to the HMD device; and displaying, under control of at least one controller for the HMD device, the image on the HMD device from the modified copy, including using the retained first pixel values to control display in the primary region, and using the replaced at least some pixel values to control display in the secondary regions by generating new blocks from the created sub-blocks and the changed pixel values.

26. The method of claim 25 wherein the one or more first channels are red and blue and the creating of the single sub-block for each block with pixel values of red or blue is performed to reduce both a pixel quantity and a size of color data for the red and blue color channels in the secondary regions, and wherein the one or more second channels are green and the creating of the multiple sub-blocks for each block with pixel values of green is performed to reduce a size of color data for the green color channel in the secondary regions while providing a higher resolution for the green color channel in the secondary regions than for the red and blue color channels in the secondary regions.

27. The method of claim 26 wherein the video frame data is received in a rectangular format, wherein the image is displayed on the HMD device with only a non-rectangular subset of the image being visible that does not include one or more tertiary regions of the image, and wherein the encoding of the image to generate the modified copy includes reducing a size of color data for the tertiary regions by changing pixel values to a constant value.

28. The method of claim 25 wherein the receiving and the encoding and the transmitting and the displaying are performed for each of a succession of multiple video frames, and wherein the determining is performed dynamically for each video frame based on tracking a gaze of a user of the HMD device to identify the primary region as an area at which the gaze is directed.

29. The method of claim 25 wherein the HMD device is connected to the video rendering computing system via a wireless connection over which the transmitting occurs, and wherein the encoding of the image to generate the modified copy is performed at a level of compression based on at least one of a signal strength or bandwidth of the wireless connection.

* * * * *